May 18, 1937.  E. J. McMAHON  2,080,428

RECIPROCATING MECHANISM

Original Filed Sept. 19, 1932

Inventor
Edward J. McMahon
By:
Atty.

Patented May 18, 1937

2,080,428

UNITED STATES PATENT OFFICE 2,080,428

RECIPROCATING MECHANISM

Edward J. McMahon, Bronson, Mich., assignor to Bronson Reel Company, Bronson, Mich., a corporation of Michigan Application September 19, 1932, Serial No. 633,794
Renewed June 3, 1935

15 Claims. (Cl. 242—84.4)

This invention relates to reciprocating mechanism more particularly for level winding fishermen's reels.

Among other objects, the invention aims to provide an improved construction which avoids weaknesses in the present known mechanisms. In conventional structures, it has been common to provide a carriage having a bore therethrough adapted to slidingly receive a double threaded shaft, the carriage carrying a cylindrical member having a blade portion projected into the bore to engage the threads and having a cylindrical slot therein receiving said member and permitting the member to cant in the slot upon actuation by the threads of the shaft. This construction, as it has been heretofore supposed, has required that the cylindrical slot intersect the bore, thus undesirably cutting away a portion of the wall of the bore equal to the circular area of the cylindrical slot. In small structures such as fishermen's reels which are required to sustain relatively great stresses and extremely hard wear, the weakening of the wall of the bore has been a serious disadvantage and it is an object of my invention to provide a structure which minimizes the extent to which the wall of the bore is cut away.

My invention will be more fully explained in conjunction with the accompanying drawing, in which—

Figure 1:
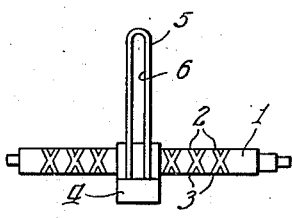
Figure 1 is an elevational view of a threaded shaft and carriage with which my invention is employed.
Figure 2:
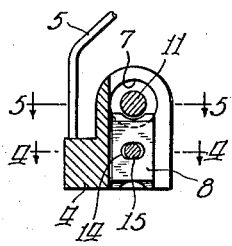
Figure 2 is a vertical sectional view of the carriage on a larger scale, parts being shown in elevation.
Figure 3:
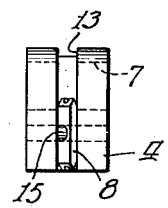
Figure 3 is an end elevation of the structure of Figure 2 taken from the right hand side.
Figure 6:
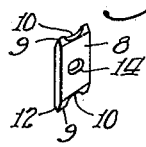
Figure 6 is a perspective view of one form of pawl used with my invention.

The rotatable shaft 1 may be employed in the conventional structure of a fisherman's reel, for example, the shaft being rotatable by means of the usual hand wheel and gears, not here shown. To act as a member in the illustrative reciprocating mechanism the shaft 1 is threaded as here shown by having the intersecting helical grooves 2 and 3 cut therein, the grooves 2 and 3 merging into each other at each end of the shaft in a return bend so as to provide a single continuous double direction reversing thread.

The carriage 4 is the member which is to be reciprocated by the rotation of the shaft 1 and this carriage may carry a guide 5 in the form of a hair pin loop through the slot 6 of which the fishing line may run to be guided on to the winding reel (not here shown) in the usual well-known manner.

In further pursuance to well-known practice, the carriage 4 has a bore 7 therethrough through which the shaft 1 slidingly passes and the carriage is adapted to be reciprocated on the shaft 1 by a member carried by the carriage and having a portion projected into the bore 7 to run in the grooves 2 and 3.

As shown in Figures 2 to 6, inclusive, this member is represented by the flat pawl 8 having a blade portion 9 at each end, either one of these blade portions being adapted to project into the bore 7 and enter the grooves 2 and 3, the blades being arcuately recessed as at 10 to accommodate the body 11 of the shaft 1, each of the blade portions 9 thus having the V-shaped horns 12 at each end of the arcuate recess 10 and projected on each side of the body 11 of the shaft 1. The pawl is conveniently blanked out of sheet metal and swedged to shape in a punch press thereby providing smooth hard wearing surfaces on the blade 9.

Since the grooves 2 and 3 are respectively oblique to the bore 7 in opposite directions, means must be provided for permitting the pawl 8 to be canted in either direction to accommodate itself to the direction of the threads of the grooves 2 and 3.

Figure 5:
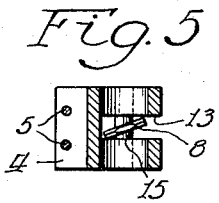
Figure 5 is a cross section taken on the line 5—5 of Figure 2.
Figure 4:
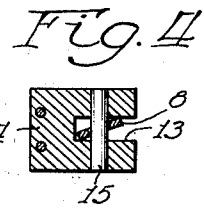
Figure 4 is a cross section taken on the line 4—4 of Figure 2.

The pawl 8 is carried by the carriage 4 in a slot which is perpendicular to and intersects the bore 7 and as shown in Figures 2 to 6, inclusive, the flat pawl 8 requires merely a relatively narrow slot 13 which need be only sufficiently wider than the thickness of the pawl 8 to permit the pawl to cant in this slot to accommodate itself to the inclinations of the grooves 2 and 3. Thus, as best shown in Figure 5, the wall of the bore 7, where the slot 13 intersects the bore, is cut away to a relatively small extent, so that the weakening of the wall of the bore by such necessary cutting away thereof is reduced to a minimum.

As shown in Figures 2 to 6, inclusive, to prevent displacement of the pawl 8 with respect to the carriage 4, other than the canting of the pawl already described, the pawl may have a hole 14 centrally therethrough through which a pin 15 loosely passes, the hole 14 being of sufficiently larger diameter than the pin 15 to permit the pawl to cant on the pin. The pin 15 may be received with a tight driving fit in oppositely disposed drilled holes on each side of the slot 13.

Figure 7:
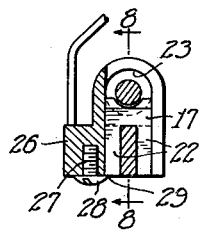
Figure 7 is a view similar to Figure 2 but showing a modified form of carriage and pawl.
Figure 8:
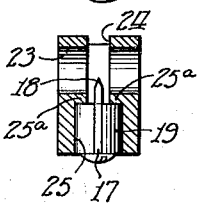
Figure 8 is a section taken on the line 8—8 of Figure 7.
Figure 9:
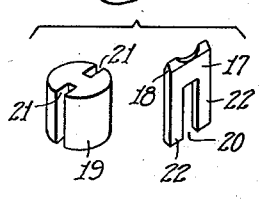
Figure 9 is a perspective view of the pawl and detent shown in Figures 7 and 8.

As shown in Figures 7 to 9, inclusive, the pawl 17 may be flat similarly to the pawl 8 and may have the blade portion 18 at one end thereof similar to one of the blade portions 9 and the advantages of the well-known cylindrical pawl may be retained by the provision as here shown of a cylindrical detent 19 separable from but forming an operative part of the pawl 17. The pawl 17 may be longitudinally recessed as at 20 and the detent 18 may have the longitudinal diametrically disposed recesses 21 therein which receive the legs 22 of the pawl, these legs being formed by the portions of the pawl on each side of the longitudinal recess 20.

To retain the advantages of the relatively narrow slot in the carriage intersecting the bore 23 the rectangular slot 24 may be provided therein similar to the slot 13 to receive the pawl 17 therethrough, but this rectangular slot 24 may be enlarged cylindrically at its outer end as at 25 to receive the detent 19, the slot 25 thus forming a continuation of the slot 24 but terminating short of the bore 23. The wall portions 25a are thus left intact upon each side of the relatively narrow slot 24. The pawl 17 may therefore be canted in the slot 24 and is prevented from being displaced therefrom by the detent 19 which swivels in the cylindrical slot 25 to accommodate itself to the canting of the pawl 17. To retain the detent and the pawl from longitudinal movement in the carriage 26, the carriage may threadedly receive a screw 27 having a head 28 which overlaps the pawl 19 as at 29, but permits the pawl to swivel with respect thereto, as described.

Figure 10:
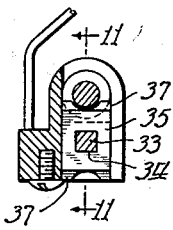
Figure 10 is a view similar to Figures 2 and 7 but showing a still further modification.
Figure 11:
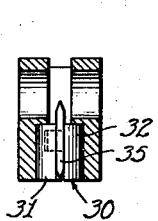
Figure 11 is a section taken on the line 11—11 of Figure 10.
Figure 12:
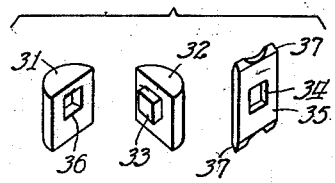
Figure 12 are perspective views of the pawl and detent employed with the structure of Figures 10 and 11.

As shown in Figures 10 to 12, inclusive, I may provide a detent 30 which functions similarly to the detent 19, but which may be formed in two semi-cylindrical halves 31 and 32, one of these halves having a tongue 33 thereon which passes through a hole 34 in the flat pawl 35 and into the recess 36 in the other semi-cylindrical half of the detent. This arrangement permits the pawl 35 to be double ended, that is, to have a blade portion 37 at each end similarly to the pawl 8 and as distinguished from the pawl 17. A double ended pawl may be advantageously reversed by the user if one of the blades becomes objectionably worn, so that in effect the user always has an extra pawl readily available. The double ended pawl is described and claimed in my co-pending application, Serial No. 610,046, filed May 9, 1932, now Patent 1,986,590 January 1, 1935.

Such changes may be made as fall within the scope of the following claims without departing from the invention.

I claim:

1. In a reciprocating mechanism, the combination with a rotatable shaft having direction reversing threads thereon; of a carriage having a bore through which the shaft passes, said carriage being slidable on the shaft over the threads; a rectangular slot in said carriage intersecting said bore; a flat pawl in said slot having a blade portion projected into the bore to engage the threads, said pawl being spaced from the walls of said slot to be canted therein upon actuation by the threads; and a retaining pin secured in said carriage and passing loosely through a hole in said pawl.

2. In a reciprocating mechanism, the combination with a rotatable shaft having direction reversing threads thereon; of a carriage having a bore through which the shaft passes, said carriage being slidable on the shaft over the threads; a rectangular slot in said carriage intersecting said bore; a double ended flat pawl in said slot having a blade portion at each end, one of said blade portions being projected into the bore to engage the threads, said pawl being spaced from the walls of said slot to be canted therein upon actuation by the threads; and a retaining pin secured in said carriage and passing loosely through a hole in said pawl.

3. In a reciprocating mechanism, the combination with a rotatable shaft having direction reversing threads thereon; of a carriage having a bore through which the shaft passes, said carriage being slidable on the shaft over the threads; a relatively narrow slot in said carriage intersecting said bore; a flat pawl in said slot having blade portions at each end, one of said blade portions being projected into the bore to engage the threads, said pawl being spaced from the walls of said slot to be canted therein upon actuation by the threads; and means carried by the carriage for retaining the blade portion in engagement with the threads, said means permitting canting of the pawl but preventing movement thereof outwardly of the slot.

4. In a reciprocating mechanism, the combination with a rotatable shaft having direction reversing threads thereon; of a carriage having a bore through which the shaft passes, said carriage being slidable on the shaft over the threads; a rectangular slot in said carriage intersecting said bore; a flat pawl in said slot having blade portions at each end, one of said blade portions being projected into the bore to engage the threads, said pawl having a hole centrally therethrough and being spaced from the walls of said slot to be canted therein upon actuation by the threads; and a member carried by the carriage and having a portion passing through the hole in the pawl to prevent displacement thereof but permitting canting of the pawl.

5. The structure of claim 4 wherein the member is a pin fixed in the carriage and passes through said slot and loosely through said hole in the pawl.

6. The structure of claim 4 wherein the member is a split cylindrical detent pivotable in a cylindrical slot in the carriage, said cylindrical slot intersecting the rectangular slot but terminating short of the bore of the carriage, said detent having two semi-cylindrical halves, and one of the halves carrying a tongue which projects through the hole in the pawl and into a recess in the other half and wherein means are carried by the carriage for retaining the detent in the cylindrical slot but permitting pivoting thereof with the pawl.

7. In a reciprocating mechanism, the combination with a rotatable shaft having direction reversing threads thereon; of a carriage having a bore through which the shaft passes, said carriage being slidable on the shaft over the threads; a relatively narrow rectangular slot in said carriage intersecting said bore; a relatively thin pawl in said slot having a blade portion at one end projected into the bore to engage the threads; a cylindrical slot in said carriage providing a continuation of the narrow rectangular slot but terminating short of the bore; a cylindrical detent in said cylindrical slot; diametrically disposed recesses in said detent; legs on the pawl received in said recesses; and a screw threadedly engaging the carriage and having a head overlapping the detent, whereby said pawl may be canted with respect to the carriage upon actuation by the threads.

8. In a level winding attachment for fishing reels, a rotatable shaft having direction-reversing threads thereon, a carriage slidable on said shaft, a flat pawl having thread-engaging portions at both ends and one end entered between said threads, said carriage having a slot for receiving said pawl, at least the portion of said slot adjacent said shaft having a dimension parallel to the axis of the shaft less than the transverse dimension of said pawl, but of greater dimension than the thickness of said pawl to permit said pawl to cant, and removable detent means retaining said pawl in operative position, but permitting end for end reversal of said pawl.

9. In a level winding attachment for fishing reels, a rotatable shaft having direction-reversing threads thereon, a carriage slidable on said shaft, a pawl having a flat end thereof entered between said threads, said carriage having a slot for receiving said flat end, at least the portion of said slot adjacent said shaft having a dimension parallel to the shaft axis less than the transverse dimension of said pawl, but of greater dimension than the thickness of said flat end to permit said pawl to cant, said slot being enlarged remote from said shaft into a cylindrical bore, and detent means including a generally cylindrical detent rotatable in said bore and slotted to receive an interengaging portion of said pawl, for retaining said pawl in operative position.

10. In a level winding attachment for fishing reels, a rotatable shaft having direction-reversing threads thereon, a carriage slidable on said shaft, a pawl having a flat blade on one end thereof entered between said threads, said carriage having a slot for receiving said blade, at least the portion of said slot adjacent said shaft having a dimension parallel to the shaft less than the transverse dimension of said blade, but of greater dimension than the thickness of said blade to permit said blade to cant, said slot being enlarged remote from said shaft into a cylindrical bore of diameter not less than the width of said blade, and detent means for retaining said pawl in operative position including a generally cylindrical detent rotatable in said bore and slot to receive an interengaging portion of said blade.

11. In a level winding attachment for fishing reels, a rotatable shaft having direction-reversing threads thereon, a carriage slidable on said shaft, a pawl having a flat blade at each end thereof, one of said blades entering between said threads, said carriage having a slot for receiving said entering blade, at least the portion of said slot adjacent said shaft having a dimension parallel to the shaft axis less than the transverse dimension of said blade, but of greater dimension than the thickness of said blade to permit said blade to cant, and detent means engaging said pawl intermediate its ends and permitting end for end reversal of said pawl.

12. A structure according to claim 11 in which said detent means includes a plurality of detent members rotatable in said bore and engaging said pawl intermediate its ends, said detent members being removable to permit end for end reversal of said pawl.

13. In a level winding attachment for fishing reels, a rotatable shaft having direction-reversing threads, the outer surfaces of said threads defining portions of a cylindrical guiding surface, a carriage guided by and slidable on said surface, said carriage having a cylindrical bore at right angles to and intersecting the axis of said shaft, said bore terminating short of said shaft to leave an intervening web between said shaft and the end of said bore, said web having guiding contact with the cylindrical surface of said shaft, said web having a narrow slot opening through to said shaft, and pawl means guided in said bore and having a blade portion projecting through said slot to enter the threads in said shaft.

14. In a level winding attachment for fishing reels, a rotatable shaft having direction-reversing threads, the outer surfaces of said threads defining portions of a cylindrical guiding surface, a carriage having a main cylindrical opening for sliding and guiding engagement with said surface, and pawl means including a blade entering said reversing threads, said carriage encircling said shaft on both sides of said pawl means and having sliding engagement with said shaft on both sides of said pawl means, and being cut away centrally only to the extent necessary to accommodate said blade, said pawl means including an enlarged portion of greater cross section than said blade but coaxial therewith, said carriage being cut away to form a bore receiving said enlarged portion, and an end wall having end abutment with the end of said enlarged portion adjacent said shaft.

15. In a level winding attachment for fishing reels, a rotatable shaft having direction-reversing threads, a carriage having a cylindrical opening coaxial with said shaft and another cylindrical bore at right angles to said opening, said bore terminating short of said opening and leaving a web between its end and said opening, said web having a slot smaller than said bore establishing communication between said bore and opening, a blade support rotatable in said bore, and a blade on said support projecting through said slot to engage said threads.

EDWARD J. McMAHON.